United States Patent [19]

Hoetzl et al.

[11] Patent Number: 5,320,329
[45] Date of Patent: Jun. 14, 1994

[54] PRESSURE PAD FOR STABLY FLOATING THIN STRIP

[75] Inventors: Max Hoetzl, Toledo; James E. Schmidt, Holland, both of Ohio

[73] Assignee: Surface Combustion, Inc., Maumee, Ohio

[21] Appl. No.: 18,145

[22] Filed: Feb. 16, 1993

[51] Int. Cl.$^5$ .............................................. C21D 9/56
[52] U.S. Cl. ................................ 266/111; 266/103
[58] Field of Search ..................... 266/103, 111, 274; 148/605, 631, 711

[56] References Cited

U.S. PATENT DOCUMENTS

| | | | |
|---|---|---|---|
| 3,181,250 | 5/1965 | Vits | 266/111 |
| 3,328,997 | 7/1967 | Beggs et al. | 266/103 |
| 3,384,282 | 5/1968 | Vits | 266/111 |
| 3,452,447 | 7/1969 | Gardner | 266/102 |
| 3,549,070 | 12/1970 | Frost | 266/111 |
| 3,982,327 | 9/1976 | Kurie et al. | 266/102 |
| 4,326,342 | 4/1982 | Schregenberger | 432/72 |
| 5,118,366 | 6/1992 | Shintaku | 266/274 |

FOREIGN PATENT DOCUMENTS

| | | |
|---|---|---|
| 2715258 | 3/1977 | Fed. Rep. of Germany . |
| 2020430 | 4/1990 | Fed. Rep. of Germany . |
| 0208027 | 11/1984 | Japan .................................. 266/111 |
| 1261440 | 11/1986 | Japan .................................. 266/111 |

*Primary Examiner*—Scott Kastler
*Attorney, Agent, or Firm*—Frank J. Nawalanic

[57] ABSTRACT

An improved pressure pad is provided for stably floating thin metal strip while heat treating the strip. The pressure pad includes an oval pad housing which is slitted adjacent the strip. An elliptical plenum chamber is disposed within the pad housing with a portion thereof spanning the slit and forming with the slit margins a leading and a trailing slot jet nozzle. Opposing jet streams of gaseous medium exit the slot jet nozzles and collide with one another to provide a zone of pressure which stably supports the strip.

24 Claims, 3 Drawing Sheets

PRESSURE PAD FOR STABLY FLOATING THIN STRIP

This invention relates generally to systems for floating strip and more particularly to pressure pad systems for stably floating thin strip.

The invention is particularly applicable to and will be described with specific reference to a pressure pad system for floating, in a stable manner, thin metal strip which is being subjected to a heat treat process while it is floated, transferred or conveyed as a continuous strip to a final destination. However, it will be appreciated by those skilled in the art that the invention has broader application and is conceptually not limited to floating metal strip (as opposed to strip made of nonmetallic material) or to floating thin (as opposed to thick continuous strip) or to performing heat treat processes on the strip while conveying same.

INCORPORATION BY REFERENCE

The patents listed below are incorporated herein by reference so that the description of the present invention need not disclose or define in detail what is known to those skilled in the art as evidenced by the disclosures set forth in the following U.S. Patents:

| Inventor | U.S. Pat. No. |
| --- | --- |
| Beggs | 3,328,997 |
| Gardner | 3,452,447 |
| Frost | 3,549,070 |
| Kurie | 3,982,327 |
| Vits | 3,181,250 |
| Vits | 3,384,282 |

BACKGROUND OF THE INVENTION

Flotation of continuous strip by pressure pads directing gas streams against the strip is a mature art as shown by the basic patents incorporated by reference herein related to work performed in the early 60's (Conceptually "strip" and "web" are used interchangeably herein, while "strip" may conventionally refer to metal and "web" may conventionally refer to non-metallic materials, the system disclosed herein will float both metallic and non-metallic material.) Flotation is frequently explained by referring to certain basic physical principles. Three commonly used principles to explain web flotation are the Bernoulli principle, the Coanda effect and of course the law of conservation of momentum. Combinations of the above principles are sometimes used to explain the operation of nozzle employed for web flotation.

Since these are all well known principles, they are cited in the Background to establish a reference basis. The Bernoulli principle simply stated is that the static pressure of a stream of fluid is reduced as its speed of flow is increased. The applications and illustrations of the previous statement are virtually unlimited. Some of the more commonly used examples are: the Venturi meter, the atomizing sprayer, and the plates suspended by air from a nozzle above the plate. The Coanda effect is the tendency of a gas or liquid coming out of a jet to attach itself to an adjacent wall contour when the wall direction of curvature is away from the axis of the jet. Conservation of momentum is a fundamental law of mechanics stating that a force is produced which is proportional to the rate of change of momentum. The force on a web can be predicted by considering the direction and momentum of the fluid leaving the nozzle and the change in direction and momentum of the fluid in contact with the web.

Again, the flotation of a web or strip by air or some other gas is accomplished by considering all the forces acting at any part of the web: i.e. the force of gravity, tension and forces exerted by the air or gas supplied to one or both sides of the web. The position of the web relative to the nozzle is where all the forces are in equilibrium. Other important considerations relating to the understanding of the operation of flotation nozzles include, (1) entrainment of secondary air in the area of the nozzle supplementing the primary air from the nozzle and (2) the return air arrangement which affects floating height and heating of the web.

The design principles discussed generally above have been utilized to developed various nozzle or pressure pad designs for floating or suspending strip on a gas cushion. When a heat treatment process is involved, the object becomes not only to stably float the continuous web (and optionally move it in a controlled manner from point A to point B) but also to impinge the web with a gas at high velocity and at a different temperature (either hotter or colder) to effect rapid heat transfer therewith i.e., effecting a high, mass heat transfer between gas and strip.

Despite claims made by conventional pressure pad manufacturers, it has nevertheless been experienced that impacting or impinging the strip with high velocity jet flow caused the strip (especially thin gauge strip which for aluminum is less than 0.040") to flutter and that such fluttering, became so severe that the strip actually contacted the pressure pad above or below (or sometimes both) the strip with the result that strip marking occurred. Because the strip is thin gauge, reducing the velocity of the gas jet will produce (as predicted by design principles discussed above), a strip which is capable of being stably floated between the pads without significant flutter. However, the mass flow of heat treating gas through the pad or the nozzle is correspondingly reduced, which means that either the strip line speed will have to be reduced to allow the pressure pad adequate time to effect sufficient heat transfer with the strip (either heating or cooling), or alternatively, additional pressure pads have to be installed thus increasing the length of the flotation system to obtain the desired strip temperature dictated by the heat treat process. A study or survey of existing pressure pad designs, including those of the current assignee of this invention, failed to disclose a pad design which, for light gauge strip (especially strip which may vary in gauge thickness lengthwise), could stably float the strip while simultaneously effecting high heat transfer rates with the strip.

SUMMARY OF THE INVENTION

Accordingly, it is one of the principle objects of the present invention to provide a flotation system using a special pressure pad design which will stably float light metal strip and reduce strip flutter to the point where strip marking does not occur while also maintaining high, convective heat transfer rates with the strip.

This object along with other features of the invention is achieved in a system for supporting a continuous strip of material moving in a longitudinally-extending path. The system includes a pressure pad for directing jet streams of a gaseous fluid against the strip with the pressure pad orientated to have its lengthwise direction extend transversely across the longitudinally extending path. The pressure pad includes a generally cylindrical pad housing having a transversely-extending slit of predetermined length positioned closer to the strip than any other portion of the pad housing. The slit, in turn, is defined as extending between a leading edge and a trailing edge, both edges extending transversely to the strip's path. A generally curvilinear plenum chamber within the pad housing has a baffle plate segment which spans the slit and forms with the housing a leading slot nozzle at the slit's leading edge and similarly, a transversely extending trailing slot nozzle is formed at the slit's trailing edge. An arrangement is provided to direct a gaseous medium through the leading and trailing nozzles to form opposed high speed jet streams of gaseous medium traveling along the curvilinear baffle segment for supporting the strip while simultaneously creating under pressure zones adjacent the housing slot nozzles whereby the pad housing configuration is such that pad contact with the strip is avoided.

In accordance with another feature of the invention, the baffle segment is convex and extends at its longitudinal center to a position which is spaced closer to the strip than that of the leading and trailing slot nozzles thereby providing a symmetrical, curvilinear path for the leading and trailing jet streams to travel in a non-turbulent manner prior to colliding with one another so that strip flutter is minimized.

In accordance with yet another aspect of the invention the plenum chamber is generally elliptical in cross section and has its length orientated to extend transversely to the strip movement path. The plenum chamber has a discharge mechanism situated at its longitudinal center portion which is diametrically opposite the baffle plate segment to direct the gaseous medium into the pad housing at equal volumetric rates and pressures to the first and second nozzles so that the overall power requirements necessary to generate jet streams of gaseous medium at pressures and intensities sufficient to float the strip is minimized.

In accordance with another more specific feature of the invention, the leading and trailing nozzles are identical and the strip is simply floated whereas the invention contemplates that one of the slotted nozzles may vary either in dimensional position or nozzle size with respect to the other to direct the movement of the strip in a predetermined axial direction at a predetermined velocity along the longitudinal path.

In accordance with another aspect of the invention a pressure pad is provided for supporting a continuous strip of material moving there across and the pressure pad includes an elongated pad housing having a generally oval, cross-sectional configuration. The housing is slit on one side along its length with the slit in turn defined at its margins by a trailing edge and a leading edge extending along the pad housing length. Situated within the pad housing is an elongated plenum chamber having a generally elliptical cross-sectional configuration with the plenum chamber having a baffle segment spanning the housing's slit to define between the housing's trailing edge and the baffle segment a trailing edge slot nozzle and similarly defining between the housing's leading edge and the baffle segment a leading edge slot nozzle. The plenum chamber has an elongated discharge slit situated diametrically opposite the baffle segment whereby thin strips can be readily supported without significant flutter.

In accordance with yet another specific aspect of the invention an apparatus for heat treating a continuous strip of metal generally traveling horizontally is provided. The heat treat apparatus includes a generally horizontally-oriented, longitudinally-extending heat transfer zone; a mechanism for passing the metal strip through the heat transfer zone along a generally horizontal, longitudinally-extending flow path axis; and a mechanism for supporting and directing a gaseous medium at a predetermined temperature in convective heat transfer contact with the strip. The support mechanism includes a first pressure pad situated beneath the strip and the first pressure pad has a generally elongated pad housing of oval cross-sectional configuration extending transversely to the flow path axis. The pad housing has a slit formed along its length with the slit defined as a space extending between a trailing edge and a leading edge so that the trailing and leading edges are generally parallel one another and extend transverse to the path. Importantly, the trailing and leading edges are situated closer to the strip than any other part or portion of the pad housing. A plenum chamber is provided within the pad housing and the plenum chamber has a general curvilinear, baffle segment spanning the slit and forming with the leading edge a slotted, leading edge nozzle and forming with the trailing edge, a slotted, trailing edge nozzle with the baffle segment at the central portion of the plenum chamber being spaced closer to the strip than the pad housing. A mechanism is provided for directing the gaseous medium into the plenum chamber and from the plenum chamber to the slotted nozzles whereby the geometry of the central portion of the plenum chamber in combination with the positioning of the slotted nozzles support thin strip without flutter while effecting convective heat transfer between the gaseous medium and the strip.

According, it is one of the objects of the present invention to provide a flotation system, or a pressure pad or a heat transfer process for supporting a continuous, moving strip of thin gauge material.

It is yet another object of the invention to provide a flotation system, or a pressure pad arrangement for effecting rapid, convective heat transfer with a continuous moving strip of material.

It is still another object of the invention to provide a flotation system, or a pressure pad or a heat transfer mechanism for not only supporting a continuous strip but also for moving the strip at a predetermined velocity and direction along its path.

Still yet another object of the invention is to provide a flotation system or a pressure pad or a heat transfer mechanism in which the gaseous medium ejected from the pressure pad is piped or supplied or developed within the pressure pad with minimum pressure drop losses thus minimizing the horse power or power required to float the strip.

Still another important object of the invention is to provide a flotation system or pressure pad design which permits high convective heat transfer rates with metal strip such that the length of the heat treat installation in which the strip is to be heated or cooled is minimized or alternatively the speed of the strip line is maximized.

Still yet another specific object of the invention is t provide a pressure pad design, which by its shape provides high, convective jet impingement with a continuously moving strip or web of material with a minimal amount of strip flutter despite high jet impingement pressures.

Still yet another object of the invention is to provide a relatively inexpensive pressure pad or pressure pad system for floating a continuous strip of material.

Another object of the invention is to provide a pressure pad system which can continuously process both thick and thin gauge strip without changing the dimensional sizing of the system components.

Still yet another object of the invention is to provide a highly versatile pressure pad system which can process a wide variety of endless strip with a minimal amount of line space utilization.

Still yet another important object of the invention is to provide a pressure pad system which minimizes twisting the strip and thus can be applied to heat treat both wide and narrow strip.

These and other objects of the invention will become apparent to those skilled in the art upon reading and understanding the preferred embodiment of the invention described in detail below taken in conjunction with the drawings attached hereto which form a part hereof.

DETAILED DESCRIPTION OF THE INVENTION

Figure 1:
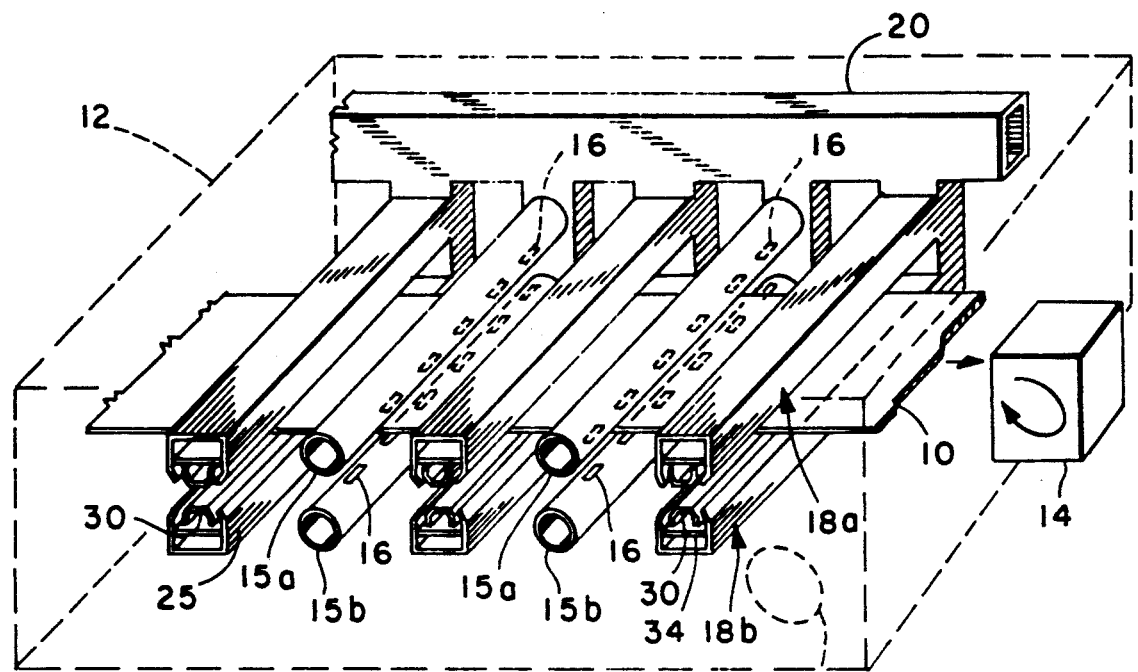
FIG. 1 is a perspective schematic view of a prior art, pressure pad.
Figure 2:
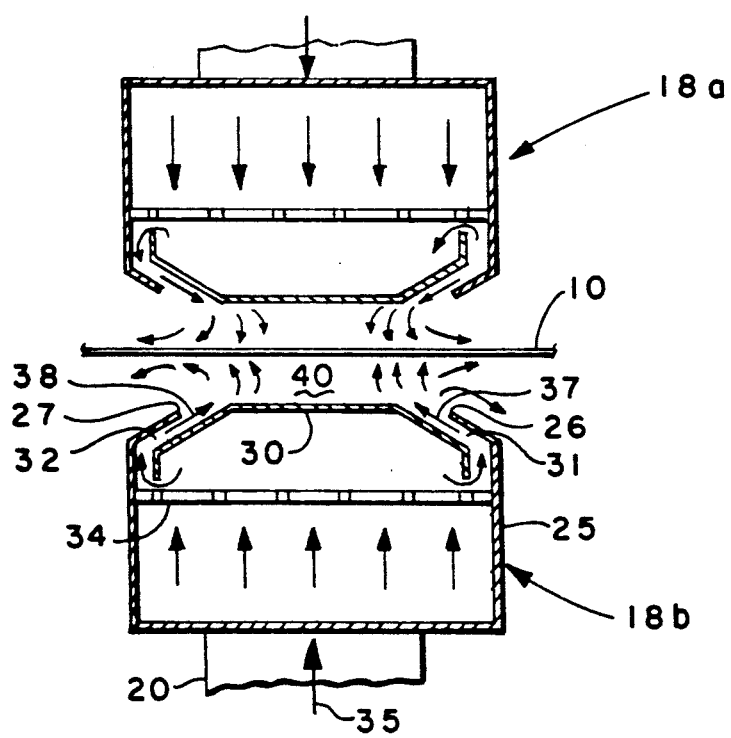
FIGS. 2, 3 and 5 are schematic, longitudinally-sectioned views of prior art, pressure pads.

Referring now to the drawings wherein the showings are for the purpose of illustrating a preferred embodiment of the invention only and not necessarily for limiting same, there shown in FIGS. 1 and 2 in schematic form a prior art pressure pad flotation system of the type manufactured and sold by the assignee of the present invention, Surface Combustion, Inc. This system has been installed in a wide variety of applications and is tried and proven. Reference may be had to U.S. Pat. No. 3,328,997 to Beggs, et al. for a more detailed description of the system than that which will be described herein.

For the purposes of this invention, a web flotation system is disclosed generally in FIG. 1. In this system a continuous strip or web of material (preferably metal in the preferred embodiment) is passed through an enclosure indicated schematically by dot-dash line 12. The enclosure 12 and metal strip 10 is shown at FIG. 1 to be horizontal which is the position of strip 10 and enclosure 12 in the preferred embodiment. Other attitude orientations can be employed. Enclosure 12 functions to maintain the atmosphere of strip 10 sealed from outside influences. Conventional knife edge "air-seal" arrangements can be employed at the entrance and exit ends of enclosure 12 to maintain the integrity of the atmosphere within enclosure 12. The point is enclosure 12 functions to maintain both the atmosphere surrounding the strip and the temperature of the strip sealed from the outside or ambient influences. This is the preferred embodiment. Those skilled in the art will recognize that, depending on the heat treat process enclosure 12 can be done away with. In such instance, the pressure pad system will simply suspend and effect heat transfer with the strip in ambient conditions. Also not shown in FIG. 1 is the conventional coiling and uncoiling mechanism for the strip and also the mechanism for pulling the strip through enclosure 12 at a fixed velocity which mechanism is simply designated by box 14 in FIG. 1. This is optional since it is possible to control the velocity of strip 10 by the design of the pressure pads.

In accordance with the broad aspects of the invention strip 10 can comprise any continuous web like material and be metallic or non-metallic. In accordance with a specific aspect of the invention however, it is preferred that strip 10 be metallic and in accordance with a still more preferred aspect of the invention the strip is preferred to be of light gauge. Light gauge as used herein means less than about 0.040" in thickness for aluminum. Other materials will have different gauges depending on their density. It is intended to include all such materials within the invention. This reference to aluminum is simply for explanation purposes only.

In the preferred embodiment the strip is aluminum and the width of the strip is relatively narrow i.e., anywhere from about 3.8" or less to 8" wide and more specifically from 5" to 7" in width. The width of strip 10 is insignificant to the working of the invention because, as will be discussed later, the wind is supplied to the floating surface (i.e., the baffle plate segment) in a uniform manner. Strip twisting is thus avoided and narrow and wide strips can be processed. As of the date of this application tests have not been run to definitely establish how narrow strip 10 can become before twisting, if at all, becomes a concern. Again, the invention contemplates processing both wide and narrow strip without twisting becoming any significant concern.

The strip length is of course indefinite and the line speed as a point of reference for the preferred embodiment can be as high as 1,000 feet per minute. Also, the thickness of the strip can vary along its length and in fact does vary. For example, the thickness can change from 0.030" to 0.090" in as little as two (2) feet of strip length. Thus the line has to be dimensionally sized to process continuously both thick and thin strip without any line support to vary or optimize the pad design for the particular strip being processed.

In the prior art strip flotation system illustrated in FIG. 1 there are top and bottom heat distribution conduits 15A, 15B. Heat distribution conduits 15 are shown as comprising elongated slots 16 which direct jets of gaseous medium into heat transfer contact with strip 10. Interspersed among heat distribution conduits 15 are top and bottom pressure pads 18A, 18B which are shown in further detail in FIG. 2. Several comments are in order. First, heat distribution conduits 15 in the present invention are entirely optional. Pressure pads 18 are able to effect sufficient heat transfer with strip 10 without heat distribution conduits 15. Also, it is noted that in theory, the presence of one or more top pressure pad 18A or top heat distribution conduit 15A could be omitted. In practice, especially for thin gauge strip, both top and bottom pads 18A, 18B are used. From a heat transfer analysis, it is desirable that top and bottom pads 18A, 18B and top and bottom heat distribution conduits 15A, 15B be utilized. A manifold arrangement 20 supplies a gaseous medium (typically air) to top and bottom pressure pads 18A, 18B and top and bottom heat distribution conduits 15A, 15B. Optionally, if enclosure 12 is utilized an exhaust shown in FIG. 1 by phantom line 21 can be provided in enclosure 12 for exhausting the "spent" enclosure atmosphere after it impinges against moving strip 10. In applications where enclosure 12 is not required, such as in strip cooling, the "spent" gas would simply be exhausted to ambient atmosphere.

The configuration of top and bottom prior art pressure pad 18A, 18B, will be explained in further detail because of the somewhat similar configuration of the prior art pressure pad with the configuration of the present invention. More particularly, referring to FIG. 2, pressure pad 18 includes a pad housing 25 having a transversely extending slit of predetermined length positioned closer to strip 10 then any other portion of pad housing 25. The slit or more particularly the slit margins, in turn are defined by a leading edge 26 extending transversely to the path of movement of strip 10 and a trailing edge 27 also extending transversely to the path of movement of strip 10. Thus, the slit in pressure pad housing 25 extends between leading edge 26 and trailing edge 27. Placed within and spanning the slit is a baffle plate segment 30. Baffle plate segment 30 is straight and parallel to strip 10 and baffle plate segment 30 is also spaced closer to strip 10 than either leading or trailing edges 26, 27. Baffle plate segment 30 in conjunction with leading edge 26 forms a leading slot nozzle 31. Similarly, baffle plate segment 30 in conjunction with trailing edge 27 forms a trailing slot nozzle 32. A baffle diverter plate 34 spans the inside of pad housing 25. A gaseous medium indicated by arrows 35 is pumped through pad housing 25 through diverter plate 34 and thence through leading and trailing slot nozzles 31, 32. Slot nozzles 26, 27 in turn produce a leading slot jet stream of gaseous medium indicated by arrow 37 and a trailing slot jet stream of gaseous medium indicated by arrow 38. Slot jets 37, 38 oppose one another to produce a stagnant zone of pressure indicated by reference numeral 40. The prior art pressure pad has been described thus far with respect to the bottom pressure pad 18B. The exact same structure is employed in the top pressure pad 18A and will not be repeated. As already indicated, this pressure pad configuration and system is tried and commercially proven and will float both thick and thin gauge strip.

Figure 3:
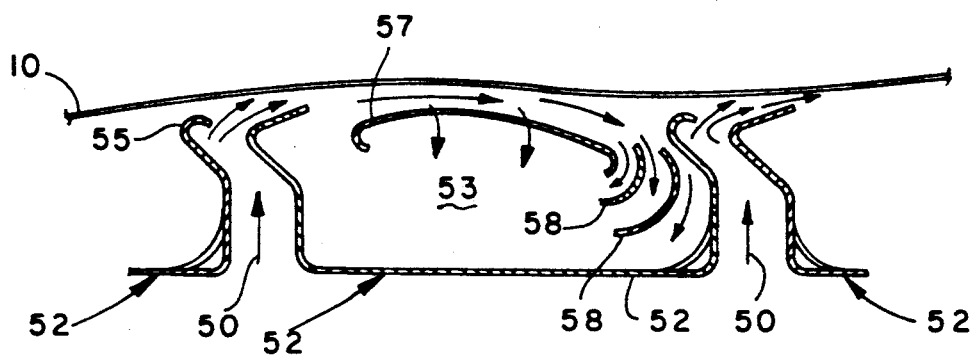
Figure 4:
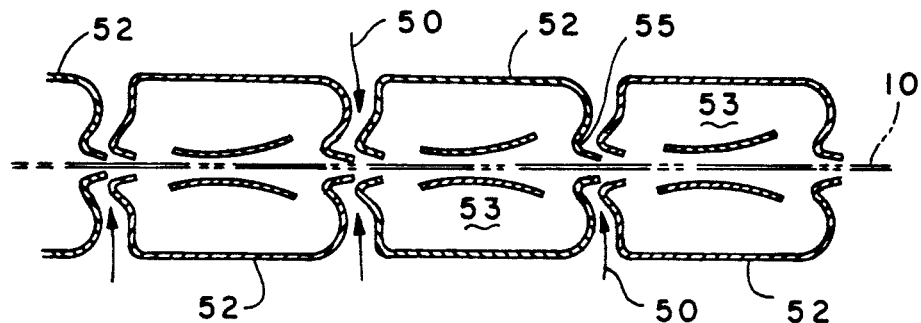
FIG. 4 is a schematic, longitudinally-sectioned view of a prior art pressure pad system suited for thin gauge strip.
Figure 5:
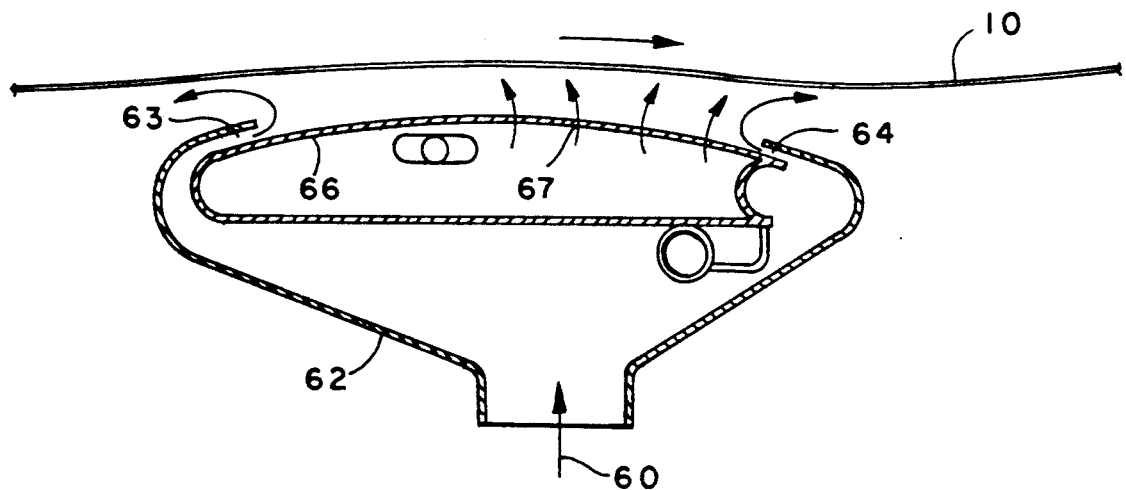

FIGS. 3 and 4 illustrate the pressure pad arrangement disclosed in Vits U.S. Pat. No. 3,384,282. FIG. 5 illustrates a further variation by Vits of the FIG. 3 and 4 pressure pad design which is disclosed in German Offenlegungsschrift 2,020,430 dated Dec. 2, 1971. The pressure pad shown in FIGS. 3 and 4 and in FIG. 5 are designed for thin strip. (See also Kurie et al. U.S. Pat. No. 3,982,327 in this regard.)

In the prior art flotation system illustrated in FIGS. 3 and 4 the gaseous heat transfer medium represented by arrows 50 enter between adjacent pressure pad housings 52. The pressure pad housing 52 has an interior 53 which is connected to exhaust 21 (see FIG. 1). The V-shaped configuration indicated by reference numeral 55 between adjacent pressure pad housings 52 orientates the gaseous heat transfer medium 50 to assume the direction of the arrows shown in FIG. 3 and in this connection, a central baffle plate 57 along with end baffle plates 58 provide a smooth transition path to interior 53 of pad housing 52. Note that central baffle plate segment 57 has apertures 60 extending therethrough for flow into interior 53. Note also that the distance from strip 10 to central baffle plate segment 57 is more than the distance from V-shaped entrance 55 to strip 10. That is, the closest point of the pressure pad arrangement shown in FIGS. 3 and 4 relative to strip 10 is V-shaped entry end 55. Again, the pressure pad configuration shown in FIGS. 3 and 4 is stated to permit flotation of thin gauge strip without serious flutter or vibration problems.

It is believed that FIG. 5 is or represents an improvement by Vits over his pressure pad design illustrated in FIGS. 3 and 4. In FIG. 5 the heat transfer gaseous medium designated by reference arrow 60 is fed off center to pressure pad housing 62 which has opposing trailing slot jet 63 and leading slot jet 64 not entirely dissimilar to the arrangement shown in FIG. 2. More particularly, the prior art pressure pad of FIG. 5 is somewhat similar to the pressure pad prior art configuration discussed for FIG. 2 in that the exhaust is outside the pressure pad housing 62 i.e., the reverse of the prior art shown in FIGS. 3 and 4. On the other hand, a baffle plate segment 66 which is not dissimilar to baffle plate segment 57 of FIG. 3 is provided. Baffle plate segment 66 combines with pressure pad housing 62 to form trailing and leading slot jets 63, 64. Baffle plate segment 66 like baffle plate segment 57 also includes perforations 67 for directing additional streams of gaseous medium 60 against web strip 10.

Pressure pad designs discussed for FIGS. 1–5 are conventional. They do work in that they have been built and operated to float strip or web and have effected heat transfer between strip and gaseous medium by convective jet impingement. As indicated above, there are limitations in the heat transfer rates which can be effected by jet impingement of the prior art pressure pads when strip or web 10 is light gauge without causing excessive fluttering of strip 10. The prior art pads are also limited in their ability to continuously process both thick and thin gauge strip.

THE INVENTION

Figure 6:
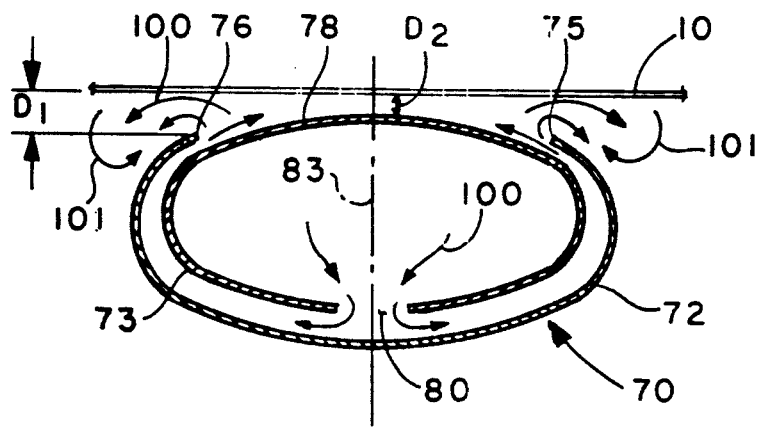
FIGS. 6 and 7 are sectioned, schematic views of the pressure pad of the present invention.
Figure 7:
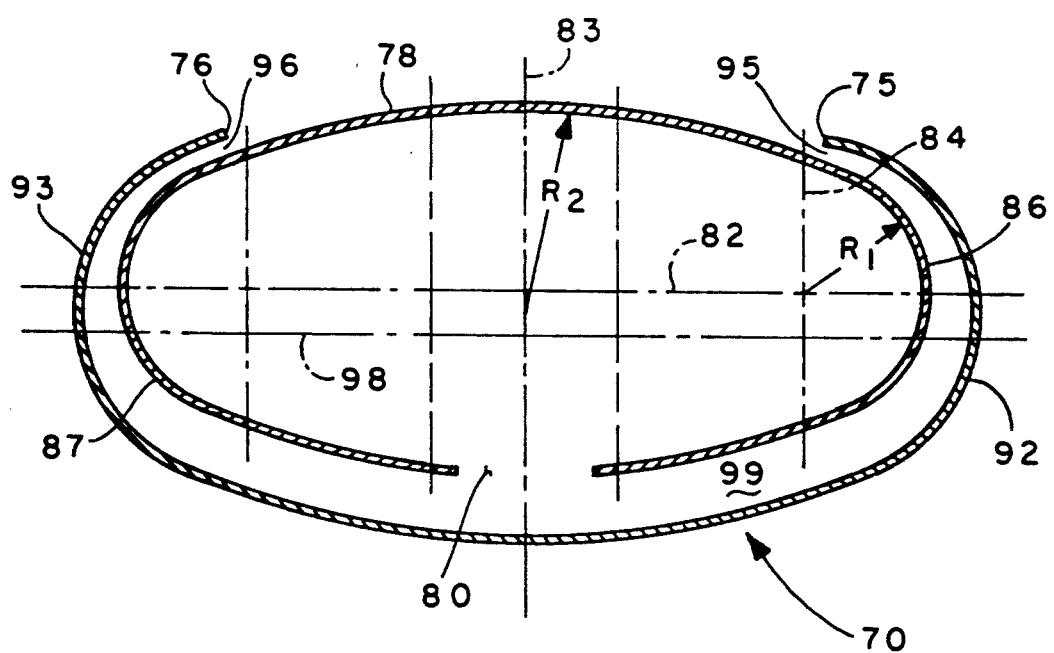

Referring now to FIG. 6 and 7 there is generally illustrated a cross sectional view of a pressure pad 70 of the present invention. Bottom pad 70 is illustrated. It should be understood that a top pad 70 (not illustrated) would also be applied above strip (or web) 10 and that if a top pad were applied it would be substantially the same as bottom pad 70. (In practice this is true only if the gauge is relatively constant. To keep the thin gauge from floating too high, top pads are needed. Typically, the slots in the top pads are one-half to two-thirds the width of the slot in the bottom pad. One reason for not making the slot widths of the top and bottom pads constant, is to reduce the air flow and horsepower since not as much hold down force is required as left.)

In the preferred embodiment, pressure pad 70 will fit within enclosure 12 which is shown in FIG. 1. Further, a manifold 20 will be provided at at least one axial end (preferably at both axial ends) of pressure pad 70 for conducting a gaseous medium into pressure pad 70. Manifold 20 can be simply one manifold at one axial end of each pressure pad 70 or there could be two manifolds 20, one at each axial end of each pressure pad 70. Manifolds 20 can be within or outside enclosure 12. Enclosure 12 will also have an exhaust 21. Further heat distribution conduits 15 could be interspersed between pressure pads 70 such as shown in FIG. 1. Also, while the preferred embodiment contemplates an enclosure 12, it should be clear that in some applications, (particularly cooling of aluminum strip) a heat transfer enclosure is not required. That is, the strip would simply leave the furnace and be cooled by the FIG. 1 arrangement which would not employ any enclosure and the gaseous medium in that case would be air at ambient temperatures. Again, the gaseous medium is inputted into each pressure pad 70 through a manifold 20 situated at at least one axial end of the pressure pad 70.

As a basis for reference, strip speeds typically employed in the present invention are between about 20 to 800 ft/minute; slot jet velocities are about 10,000 ft/minute; convective heat transfer rates are about 20 Btu/ft$^2$/°F./hr. Air when heating strip is usually supplied at anywhere between 400° F. to 1100° F. When cooling strip, air or gaseous medium is supplied at temperatures anywhere from ambient to 300° F.

Pressure pad 70 includes a pressure pad housing 72 which is arcuate in configuration. Contained within pressure pad housing 72 is a baffle plenum chamber 73. Pressure pad housing 72 is slitted at the position where pressure pad housing 72 is closest to strip 10. This slit extends the length of pressure pad housing 72 and is transverse to the path or length of strip or web 10 i.e., parallel to the width of strip 10. The slit or its margins are defined by a transversely extending leading edge 75 and a transversely extending trailing edge 76. The vertical distance from either leading edge 75 to strip 10 or trailing edge 76 to strip 10 is shown in FIG. 6 to be equivalent to a distance designated as $D_1$.

Now the shape of pressure pad housing 72 has a significant bearing on the performance of pressure pad 70 and in a general sense it can be described as being arcuate or curvilinear. More specifically the cross sectional shape of pressure pad housing 72 can be described as being oval in configuration. As noted, situated within pressure pad housing 72 is baffle plenum 73 which also has a specific configuration and which is necessary to the efficient operation of pressure pad 70. Generally, baffle plenum 73 can be described as being arcuate or curvilinear in cross sectional configuration and more specifically can be described as being elliptical in cross-sectional configuration. More precisely it is necessary for the efficient operation of pressure pad 70 that the shape of that portion of baffle plenum 73 (i.e., baffle plenum central segment 78) which spans the distance between trailing and leading edges 75, 76 of pad housing 72 be arcuate or curvilinear. Further, the vertical distance between baffle plenum central segment 78 and strip 10 is shown as $D_2$ in FIG. 6 (i.e., the midpoint of baffle central segment 78.) and is closer or shorter in length than distance $D_1$. This configuration of central segment 78 produces an improved Coando effect which minimizes strip flutter while at the same time enhances strip stability by conservation of momentum achieved in sizing the distances $D_1$ and $D_2$.

Diametrically opposite baffle plenum central segment 78 is a discharge slit 80. This slit runs the length of baffle plenum 73 and is at least equal to the width of strip or web 10. Baffle plenum 73 can and should be viewed as an ellipse in the preferred embodiment and by definition has, as best shown in FIG. 7, a major axis 81, a minor axis 82 and a latus rectum from which an arc shown as $R_1$ is struck to define a leading edge segment 86 and a trailing edge segment 87 with leading edge segment 86 and trailing edge segment 87 blending into or tangent to baffle plenum central segment 78. To some extent the oval configuration of pressure pad housing 72 likewise has a leading edge segment 92 and a trailing edge segment 93 which is configured so that the leading edge segment 92 of pressure pad housing 72 converges with leading edge segment 76 of baffle plenum 73 to define leading slot edge nozzle 95 which extends the length of pressure pad 70 and at least the width of strip 10. Similarly, trailing edge segment 93 of pressure pad housing 72 and trailing edge segment 87 of baffle plenum 73 likewise converge to form a trailing slot edge nozzle 96 at trailing edge 76. Trailing edge nozzle 96 extends the length of pressure pad 70 and is at least as long as the width of strip 10. It is also possible to view the construction of pressure pad housing 72 to likewise be elliptical but in such instance the major diameter would be that shown by line 98 in FIG. 7 which would be offset from major diameter 83 of baffle plenum 73. Minor diameter 83 could be coincident for baffle plenum 73 and pad housing 72 as would latus rectum 84. Significantly, the construction of pad housing 72 and baffle plenum 73 in this manner produces a space 99 between pressure pad housing 72 and baffle plenum 73 which uniformly and gradually diminishes for both leading and trailing slot edge nozzles 95, 96. In this manner, the gaseous atmosphere indicated by arrows 100 in FIG. 6 exit discharge slit 80 into space 99 with gradually increasing velocity so that the jet stream emanating leading and trailing slot edge nozzle 95, 96 are uniform in both volumetric flow, pressure and velocity.

As is evident in FIG. 6, the jet streams (defined in the present invention as having velocities in excess of about 10,000 feet per minute) emanating from leading and trailing slot edge nozzles 95, 96 are directly opposed to one another and eventually intersect one another adjacent minor diameter axis 83 (at distance $D_2$) which produces a stable support zone at the center of pressure pad 70. Pressure pad 70 as thus defined represents an improvement over the prior art pressure pads such as those shown and described as reference numerals 18, 52, 62. Specifically, the problem resolved was to remove excessive strip vibration when processing thin strip at high nozzle pressures. Previously the pressure had to be reduced so that strip 10 would not excessively vibrate to the point where it actually struck or came into contact with the pressure pad housing. When the pressure was reduced however the heat transfer was likewise reduced resulting in a longer zone to effect heating or cooling of the strip. This in turn increased the cost of the unit and in some applications where space limitations were present, significant changes to the strip path would have to be made. Thus, the primary purpose of the pressure pad design shown in FIG. 6 and 7 is to provide stable flotation of the strip over a wide range of thicknesses without a reduction in flotation pressure so that the heat transfer rate and production capacity need not be reduced when processing thin gauge metal strip.

The design illustrated in FIGS. 6 and 7 minimizes vibration by providing a sufficient housing area adjacent leading and trailing jet nozzle 95, 96 to permit ambient air(arrows 101 in FIG. 6) to be entrained as a result of the jets to prevent strip contact with pressure pad housing 72. More specifically, and as well know to those skilled in the art, when a high speed jet stream of fluid emanates from its nozzle, a low pressure (i.e., underpressure) zone is created adjacent the jet (i.e., 95, 96). With the design of nozzles as shown in FIG. 2 or FIG. 3 or even FIG. 5, the clearance between the strip and the nozzle is relatively small and this causes the entrained air to be drawn at a high velocity which (because of the low pressure region created by the high velocity jets) creates a tendency for the strip to get sucked into and contact the edges of the pressure pad housing. In the design of the present invention as disclosed in FIGS. 6 and 7, by curving the leading edge segments 92 and trailing edge segments 93 away from the strip 10, the distance between the jet streams and strip 10 is increased i.e., $D_1$. Since the strip is further away from the low pressure region caused by the jets, a greater clearance $D_1$ results which also provides more area for the entrained air to be drawn into the jet at a lower velocity with the result that the suction effect on the strip is significantly minimized. This in turn reduces the vibration or the ability of pad 70 to support strip 10 without the strip vibrating into contact with the pad.

In addition, by forming passages 99 as discussed, fluid flow is uniformly supplied to leading and trailing slot edge nozzles 95, 96 in the desired direction for flotation. That is, in the preferred embodiment of FIGS. 6 and 7 the pressure pad will tend to maintain strip 10 stationary so that movement of the strip will be caused by device 14. However, it is expected that by simply orientating the lateral position of either trailing nozzle 96 or leading nozzle 95 relative to minor diameter axis 83, the rate of movement of the strip in an axial direction can be controlled. Alternatively, it is contemplated that by varying the space between nozzle edges 75, 76 and baffle plenum 73, movement in a longitudinal direction can be imparted to strip 10. As of the date of this application, tests have not been conducted to determine the capacity of the system to control the line speed. However, it is expected that the longitudinal speed of the strip can be controlled in the manner stated and the concept is within the invention disclosed herein.

In accordance with a still further aspect of the invention, the radius of curvature shown as $R_2$ in FIG. 7 of central baffle plate segment 78 provides a gradual curve which in turn produces a gradual acceleration of the entrained jet flow which in turn minimizes turbulence of the slotted jet streams. It is simply noted that jet turbulence will also cause strip vibration and that this is separate and apart from any considerations dealing with the underpressure zone entraining ambient atmosphere discussed above. For example, note the jet turbulence problem caused by perforations 67 in baffle plate 66 of the FIG. 5 prior art device.

Finally, a still further benefit of the pressure pad design shown in FIG. 6 and 7 is the elimination of perforated plate 34 in the FIG. 2 prior art device which is used to distribute the gaseous flow evenly to both slots. As already noted, discharge slit 80 provides a common point of discharge at the bottom center of baffle plenum 73 to produce common supply pressure and fluid flow to both leading and trailing slot edge nozzles 95, 96. By eliminating the perforated plate used in the prior art devices to control the flow of the gaseous stream to the discharge slot there is no associated pressure drop produced in the present invention. Thus less horsepower is required to float strip for any given strip thickness.

The invention has been described with reference to a preferred embodiment. Obviously alterations and modifications will occur to those skilled in the art upon reading and understanding the present invention. It is intended to include all such modifications and alterations in so far as they come within the scope of the present invention.

Having thus defined the invention it is claimed:

1. A system for supporting a continuous strip of thick or thin gauge metal moving in a longitudinally-extending path, said system including pressure pad for directing jet streams of a gaseous medium against said strip and orientated to have its lengthwise direction extend transversely across said path, said pad comprising:
   a generally cylindrical pad housing having a transversely-extending slit of predetermined length, said slit defined by a leading edge extending transversely to said strip path and a trailing edge extending transversely to said strip path;
   a generally curvilinear, baffle plate segment spanning said slit and forming with said housing a leading slot jet nozzle at said slit's leading edge and a transversely extending trailing slot jet nozzle at said slit's trailing edge, said baffle segment being convex and extending at its longitudinal center to a position spaced closer to said strip than said leading and trailing slot nozzles thereby providing a path for said leading and trailing jet streams to travel in a non-turbulent manner prior to collision with one another whereby strip flutter is minimized; and
   means to direct said gaseous medium through said leading and trailing nozzles to form opposed jet streams of gaseous medium traveling along said curvilinear baffle plate segment for supporting said strip while creating underpressure zones adjacent said housing slot jet nozzles whereby said pad housing configuration avoids inadvertent contact between said strip and said housing.

2. The system of claim 1 wherein said baffle plate segment comprises a portion of a plenum chamber within said pad housing, said plenum chamber generally elliptical in cross-section and having its length orientated to extend transversely to said path, said plenum chamber comprising a portion of said gaseous medium means, and having discharge means situated at its longitudinal center portion dimensional opposite said baffle plate segment for directing said gaseous medium into said pad housing at equal volumetric rates quantities and pressures to said first and second nozzles while minimizing power requirements for supplying said gaseous medium to said plenum chamber for floating strip of any particular thickness.

3. The system of claim 2 wherein said plenum discharge means includes a discharge slit extending the length of said plenum chamber, said discharge slit orientated to extend transverse to said path and centered between said slot nozzles.

4. The system of claim 2 wherein said pad housing is generally oval in configuration with the distance between said plenum and said housing a maximum at said discharge means and a minimum at said leading and trailing nozzles, said oval configuration of said pad housing and said elliptical configuration of said plenum gradually converging at said leading and trailing slot nozzles to accelerate the flow of said gaseous medium through said slot nozzles in a non-turbulent manner while directing said jet flow tangential to said baffle segment thereby minimizing strip flutter.

5. The system of claim 1 wherein said leading slot nozzle is substantially identical to said trailing slot nozzle.

6. The system of claim 5 wherein the distance of said leading slot nozzle to the longitudinal center of said pad housing is substantially the same as the distance of said trailing slot nozzle from the longitudinal center of said pad housing.

7. The system of claim 5 wherein the distance of said slot nozzles from the center of said pad housing are different from one another whereby said strip is not only supported by said pressure pad but moved in a predetermined longitudinal direction of travel.

8. The system of claim 5 wherein the slotted nozzle opening of said trailing edge nozzle is different than the slotted nozzle of said leading edge nozzle whereby said strip is not only supported by said pressure pad but moved in a predetermined longitudinal direction of travel.

9. The system of claim 1 wherein said strip has a thickness of less than 0.040".

10. A pressure pad for supporting a continuous strip of material moving there across comprising:
   a) an elongated pad housing having a generally oval cross-sectional configuration, said housing being slitted on one side along its length, said slit defined at its margins by a trailing edge and a leading edge extending along said housing's length; and
   b) an elongated plenum chamber having a generally elliptical cross-sectional configuration situated within said pad housing, said plenum chamber having a baffle segment spanning said housing's slit and defining between said housing's trailing edge and said baffle segment a trailing edge slot nozzle and between said housing's leading edge and said baffle segment a leading edge slot nozzle and said plenum chamber having an elongated discharge slit situated diametrically opposite said baffle segment.

11. The pressure pad of claim 10 wherein said baffle segment is curvilinear and extends a distance from its center to an elongated flat plane passing through the center of said housing which is greater than the distance from said leading and trailing edges to said elongated, flat plane.

12. The pressure pad of claim 11 wherein the spacing between said leading edge and said baffle segment is equal to the spacing between said trailing edge and said baffle segment.

13. The pressure pad of claim 11 wherein the spacing between said leading edge and said baffle segment is different than the spacing between said trailing edge and said baffle segment.

14. The pressure pad of claim 11 wherein the distance from said leading edge to said elongated plane is equal to the distance from said trailing edge to said elongated plane.

15. The pressure pad of claim 10 wherein said pad housing cross-sectional configurations further defined by a generally circular configuration having a first portion of a sharp curvature radius defined by a mirror diameter adjacent said trailing and leading edges and a second portion of a large radius of curvature defined by a major generally adjacent said discharge slit of said plenum.

16. Apparatus for heat treating a continuous strip of metal traveling generally horizontally comprising
   a) a generally horizontally oriented, longitudinally-extending heat transfer zone;
   b) means for passing said metal strip through said heat transfer zone along a generally horizontal, longitudinally-extending flow path axis; and
   c) means for supporting and directing a gaseous medium at a predetermined temperature in convective heat transfer contrast with said strip, said supporting means including a first pressure pad situated beneath said strip, said first pressure pad having
      i) a generally elongated pad housing of oval cross-sectional configuration extending transversely to said flow path axis, said pad housing having a list formed along its length, said slit defined as a space extending between a trailing edge and a leading edge, said trailing and leading edges generally parallel one another and extending transverse to said path;
      ii) a plenum chamber within said pad housing having a generally curvilinear, baffle segment spanning said slit and forming with said leading edge a slotted leading edge jet nozzle and with said trailing edge, a slotted trailing edge jet nozzle, said baffle segment at its central-portion spaced closer to said strip than said pad housing, said baffle segment being convex and extending at its longitudinal center to a position spaced closer to said strip than said leading and trailing slot nozzles thereby providing a path for said leading and trailing jet streams to travel in a non-turbulent manner prior to collision with one another whereby strip flutter is minimized; and
      iii) means for directing said gaseous medium into said plenum chamber and from said plenum chamber to said slotted nozzle for supporting said strip while effecting convection heat transfer between said gaseous medium and said strip.

17. Apparatus of claim 16 further including a second pressure pad generally identical to said first pad situated above said strip in alignment with said first pressure pad.

18. Apparatus of claim 16 wherein said plenum chamber is generally elliptical and said plenum chamber has a discharge slit situated at the center of said plenum chamber opposite said baffle segment and extending generally the length of said pad housing for directing said gaseous medium smoothly into said slotted nozzles.

19. Apparatus of claim 18 wherein said pad housing is generally oval in configuration with the distance between said plenum and said housing a maximum at said discharge means and a minimum at said leading and trailing nozzles, said oval configuration of said pad housing and said elliptical configuration of said plenum gradually converging at said leading and trailing slot nozzles to accelerate the flow of said gaseous medium through said slot nozzles in a non-turbulent manner while directing said jet flow tangential to said baffle segment thereby minimizing strip flutter.

20. Apparatus of claim 19 wherein the distance of said leading slot nozzle to the longitudinal center of said pad housing is substantially the same as the distance of said trailing slot nozzle from the longitudinal center of said pad housing.

21. Apparatus of claim 19 wherein the distance of said slot nozzles from the center of said pad housing are different from one another whereby said strip is not only supported by said pressure pad but moved in a predetermined longitudinal direction of travel.

22. Apparatus of claim 20 further including said passing means situated outside of said heat transfer zone.

23. Apparatus of claim 16 wherein the length of said pad housing is at least equal to the width of said strip.

24. Apparatus of claim 23 wherein the thickness of said strip does not exceed 0.040".

* * * * *